(12) United States Patent
Ro et al.

(10) Patent No.: US 12,204,796 B2
(45) Date of Patent: *Jan. 21, 2025

(54) MEMORY DEVICE FOR PERFORMING IN-MEMORY PROCESSING

(71) Applicant: Samsung Electronics Co., Ltd., Suwon-si (KR)

(72) Inventors: Yuhwan Ro, Seongnam-si (KR); Shinhaeng Kang, Suwon-si (KR); Seongwook Park, Ulsan (KR); Seungwoo Seo, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

This patent is subject to a terminal disclaimer.

(21) Appl. No.: 17/954,532

(22) Filed: Sep. 28, 2022

(65) Prior Publication Data

US 2023/0013611 A1    Jan. 19, 2023

Related U.S. Application Data

(63) Continuation of application No. 17/098,959, filed on Nov. 16, 2020, now Pat. No. 11,494,121.

(30) Foreign Application Priority Data

Jun. 17, 2020  (KR) ........................ 10-2020-0073733

(51) Int. Cl.
*G06F 3/06* (2006.01)
*G06F 7/523* (2006.01)
*G06N 3/063* (2023.01)

(52) U.S. Cl.
CPC .......... *G06F 3/0659* (2013.01); *G06F 3/0604* (2013.01); *G06F 3/0673* (2013.01);
(Continued)

(58) Field of Classification Search
CPC .... G06F 3/0659; G06F 3/0604; G06F 3/0673; G06F 3/0679; G06F 7/523;
(Continued)

(56) References Cited

U.S. PATENT DOCUMENTS 5,617,545 A    4/1997  Ogata et al.
7,505,352 B2   3/2009  Gyoten et al.
(Continued)

FOREIGN PATENT DOCUMENTS

CN    108630249 A    10/2018
CN    111199278 A     5/2020
(Continued)

OTHER PUBLICATIONS

Extended European Search Report issued on Dec. 2, 2021, in counterpart European Patent Application No. 21179685.9 (10 pages in English).

(Continued)

*Primary Examiner* — Jason W Blust
(74) *Attorney, Agent, or Firm* — NSIP Law

(57) ABSTRACT

A memory device includes: memory operation circuitries to perform memory processing; memory banks assigned to one of the memory operation circuitries such that a set of n memory banks is assigned to each of the memory operation circuitries; and command pads to receive a command signal from an external source, wherein, for each of the memory operation circuitries, a corresponding memory operation circuitry to access memory banks of a corresponding set of n memory banks that is assigned to the corresponding memory operation circuitry, in an order determined based on respective distances from each of the memory banks of the corresponding set of n memory banks to the command pads, and wherein, each of the memory banks of the corresponding set of n memory banks to perform an access operation of (Continued)

data requested by the corresponding memory operation circuitry while the memory processing is performed.

20 Claims, 11 Drawing Sheets

(52) U.S. Cl.
CPC ............ *G06F 3/0679* (2013.01); *G06F 7/523* (2013.01); *G06N 3/063* (2013.01)

(58) Field of Classification Search
CPC .. G06F 15/7821; G06F 3/0658; G06F 3/0688; G06F 15/785; G06F 9/30079; G06F 9/3802; G06N 3/063; G11C 7/1039; G11C 8/12
See application file for complete search history.

(56) References Cited

U.S. PATENT DOCUMENTS

| | | | |
|---|---|---|---|
| 7,706,196 | B2 | 4/2010 | Kim et al. |
| 2008/0320277 | A1 | 12/2008 | Fish, III |
| 2011/0093662 | A1 | 4/2011 | Walker et al. |
| 2013/0135007 | A1 | 5/2013 | Surico et al. |
| 2016/0231962 | A1 | 8/2016 | Ware et al. |
| 2018/0322382 | A1 | 11/2018 | Mellempudi et al. |
| 2019/0057050 | A1 | 2/2019 | Mathuriya et al. |
| 2020/0160157 | A1 | 5/2020 | Kim et al. |
| 2020/0251153 | A1 | 8/2020 | Matsuoka et al. |
| 2021/0247910 | A1 | 8/2021 | Kim et al. |

FOREIGN PATENT DOCUMENTS

| | | | |
|---|---|---|---|
| JP | 1993-342178 | A | 12/1993 |
| JP | 2001-236221 | A | 8/2001 |
| JP | 2004-326228 | A | 11/2004 |
| JP | 2007-206849 | A | 8/2007 |
| TW | 200901217 | A | 1/2009 |

OTHER PUBLICATIONS

European Office Action issued on Aug. 23, 2022, in counterpart European Patent Application No. 21 179 685.9 (8 pages in English).
Kim, Duckhwan, et al. "Neurocube: A programmable digital neuromorphic architecture with high-density 3D memory." *ACM SIGARCH Computer Architecture News* 44.3 (2016): 380-392. (13 pages in English).
Gao, Mingyu, et al. "Tetris: Scalable and efficient neural network acceleration with 3d memory." *Proceedings of the Twenty-Second International Conference on Architectural Support for Programming Languages and Operating Systems*. 2017. (14 pages in English).
Shin, Hyunsung, et al. "McDRAM: Low latency and energy-efficient matrix computations in DRAM." *IEEE Transactions on Computer-Aided Design of Integrated Circuits and Systems* 37.11 (2018): 2613-2622. (10 pages in English).
Vinçon, Tobias, Andreas Koch, and Ilia Petrov. "Moving processing to data: On the influence of processing in memory on data management." *arXiv preprint arXiv:1905.04767* (2019). (22 pages in English).
Ro, Yuhwan et al. "Reducing memory access latency with asymmetric DRAM bank organizations." *Proceedings of the 40th Annual International Symposium on Computer Architecture*. 2013. pp. 380-391.
Cooperman, Gene; "DDR RAM" 2003; available at: https://course.ccs.neu.edu/com3200/parent/NOTES/DDR.html (Year: 2003).
Allan, Graham: "DDR4 Bank Groups in Embedded Applications;" Sep. 18, 2017; available at: https://web.archive.org/web/20170918202042/http://www.synopsys.com/designware-ip/technical-bulletin/ddr4-bank-groups.html(Year: 2017).
Chinese Office Action issued on Aug. 14, 2024, in counterpart Chinese Patent Application No. 202011442348.8 (20 pages in English, 11 pages in Chinese).

MEMORY DEVICE FOR PERFORMING IN-MEMORY PROCESSING

CROSS-REFERENCE TO RELATED APPLICATION

This application is a Continuation application of U.S. patent application Ser. No. 17/098,959 filed on Nov. 16, 2020, which claims the benefit under 35 U.S.C. § 119 of Korean Patent Application No. 10-2020-0073733, filed on Jun. 17, 2020, in the Korean Intellectual Property Office, the entire disclosure of which is incorporated herein by reference for all purposes.

BACKGROUND

1. Field

The following description relates to memory devices for performing in-memory processing by using an in-memory operation unit.

2. Description of Related Art

Applications such as processing of a graphics algorithm, processing of a neural network, and the like are compute-intensive operations and require a computing system having a large amount of computation operations and memory capability. A memory device of a processor-in-memory (PIM) type, which is capable of performing some of the computation operations of the computing system via internal processing (or in-memory processing) of the memory device, is being developed. As such, the load of computation operations of the computing system may be reduced via the internal processing of the memory device. However, when separate pieces of processing hardware for the internal processing are added to the memory device, methods of efficiently performing interfacing and operation processing of the separate pieces of processing hardware may be required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a memory device for performing in-memory processing includes: a plurality of in-memory operation units configured to perform in-memory processing of an operation pipelined in multi-pipeline stages; a plurality of memory banks assigned to the plurality of in-memory operation units such that a set of n memory banks is assigned to each of the in-memory operation units, each memory bank configured to perform an access operation of data requested by each of the plurality of in-memory operation units while the pipelined operation is performed, wherein n is a natural number; and a memory die in which the plurality of in-memory operation units, the plurality of memory banks, and command pads configured to receive a command signal from an external source are arranged. Each set of then memory banks includes a first memory bank having a first data transmission distance to the command pads and a second memory bank having a second data transmission distance to the command pads that is larger than the first data transmission distance.

Each of the in-memory operation units may be configured to access the first memory bank of the respective set of the n memory banks before accessing the second memory bank of the respective set of n memory banks to perform the in-memory processing of the pipelined operation.

The memory die may further include: a bank selector configured to sequentially select, for each set of n memory banks, the first memory bank and the second memory bank based on the first data transmission distance and the second data transmission distance; and a multiplexer configured to provide, to the respective in-memory operation unit, data accessed from the first memory bank or the second memory bank selected by the bank selector.

The plurality of memory banks may include a first set of memory banks arranged at one side on the memory die and a second set of memory banks arranged at another side on the memory die, and the plurality of in-memory operation units may include a first set of in-memory operation units arranged adjacent to the first set of memory banks and connected to the first set of memory banks in a region between the first set of memory banks and the second set of memory banks, and a second set of in-memory operation units arranged adjacent to the second set of memory banks and connected to the second set of memory banks in the region.

The command pads may be arranged between the first set of in-memory operation units and the second set of in-memory operation units in the region, and the first memory bank and the second memory bank of each set of n memory banks may be classified according to the first data transmission distance and the second data transmission distance within the region.

The first set of memory banks may be classified into two groups including a first group that is arranged closer to the command pads and a second group that is arranged farther away from the command pads, and the first memory bank of each set of n memory banks is selected from the first group and the second memory bank of each set of n memory banks is selected from the second group.

A first set of n memory banks from among the first set of memory banks may be assigned to a first in-memory operation unit from among the first set of in-memory operation units, and the first in-memory operation unit may process the pipelined operation with respect to data accessed from the first memory bank of the first set of n memory banks before data accessed from the second memory bank of the first set of n memory banks.

The memory device may be a double data rate 4 dynamic random-access memory (DDR4 DRAM) module, the first set of memory banks may include 8 memory banks and the second set of memory banks may include 8 memory banks, and the first set of in-memory operation units may include 8/n in-memory operation units and the second set of in-memory operation units may include 8/n in-memory operation units.

The first set of memory banks may include first, second, third, fourth, fifth, sixth, seventh, and eighth memory banks in an order of a first direction, the first set of in-memory operation units may include first, second, third, and fourth in-memory operation units in an order of the first direction, and the first and third memory banks may be assigned to the first in-memory operation unit, the second and fourth memory banks may be assigned to the second in-memory operation unit, the fifth and seventh memory banks may be assigned to the third in-memory operation unit, and the sixth and eighth memory banks may be assigned to the fourth in-memory operation unit.

A connection between the second set of memory banks and the second set of in-memory operation units may be symmetrical to a connection between the first set of memory banks and the first set of in-memory operation units.

Each of the in-memory operation units may include at least one pipeline register configured to buffer a sub-operation result in each pipeline stage of the pipelined operation.

The pipelined operation may include a multiply-accumulate (MAC) operation of a neural network.

In another general aspect, a memory device for performing in-memory processing includes: a plurality of in-memory operation units configured to perform in-memory processing of an operation pipelined in multi-pipeline stages; and a plurality of memory banks assigned to the plurality of in-memory operation units such that a set of n memory banks is assigned to each of the in-memory operation units, each memory bank configured to perform an access operation of data requested by each of the plurality of in-memory operation units while the pipelined operation is performed, wherein n is a natural number. Each set of the n memory banks may include a first memory bank having a first physical distance for data transmission of a command signal provided from an external source and a second memory bank having a second physical distance for the data transmission of the command signal that is larger than the first physical distance.

Each of the in-memory operation units may be configured to access the first memory bank of the respective set of the n memory banks before the second memory bank of the respective set of n memory banks to perform the in-memory processing of the pipelined operation.

The memory device may further include: a bank selector configured to sequentially select, for each set of n memory banks, the first memory bank and the second memory bank based on the first physical distance and the second physical distance; and a multiplexer configured to provide, to the respective in-memory operation unit, data accessed from the first memory bank or the second memory bank selected by the bank selector.

In another general aspect, a memory device includes in-memory operation units configured to perform in-memory processing of a pipelined operation of a neural network; memory banks, each memory bank being assigned to one of the in-memory operation units such that a set of n memory banks is assigned to each of the in-memory operation units, each memory bank configured to perform an access operation of data requested by the assigned in-memory operation unit while the pipelined operation is performed, where n is a whole number greater than or equal to 2; and command pads configured to receive a command signal from an external source. Each of the in-memory operation units is configured to access the memory banks from the respective assigned set of n memory banks in an order determined based on a distance from each of the memory banks in the respective set of n memory banks to the command pads.

The distance from each of the memory banks in the respective set of n memory banks to the command pad may be a data transmission distance, and each of the in-memory operation units may be configured to access the memory banks from the respective assigned set of n memory banks in an ascending order of the data transmission distance.

The distance from each of the memory banks in the respective set of n memory banks to the command pad may be a physical distance, and each of the in-memory operation units may be configured to access the memory banks from the respective assigned set of n memory banks in an ascending order of the physical distance.

Other features and aspects will be apparent from the following detailed description, the drawings, and the claims.

Figure 1:
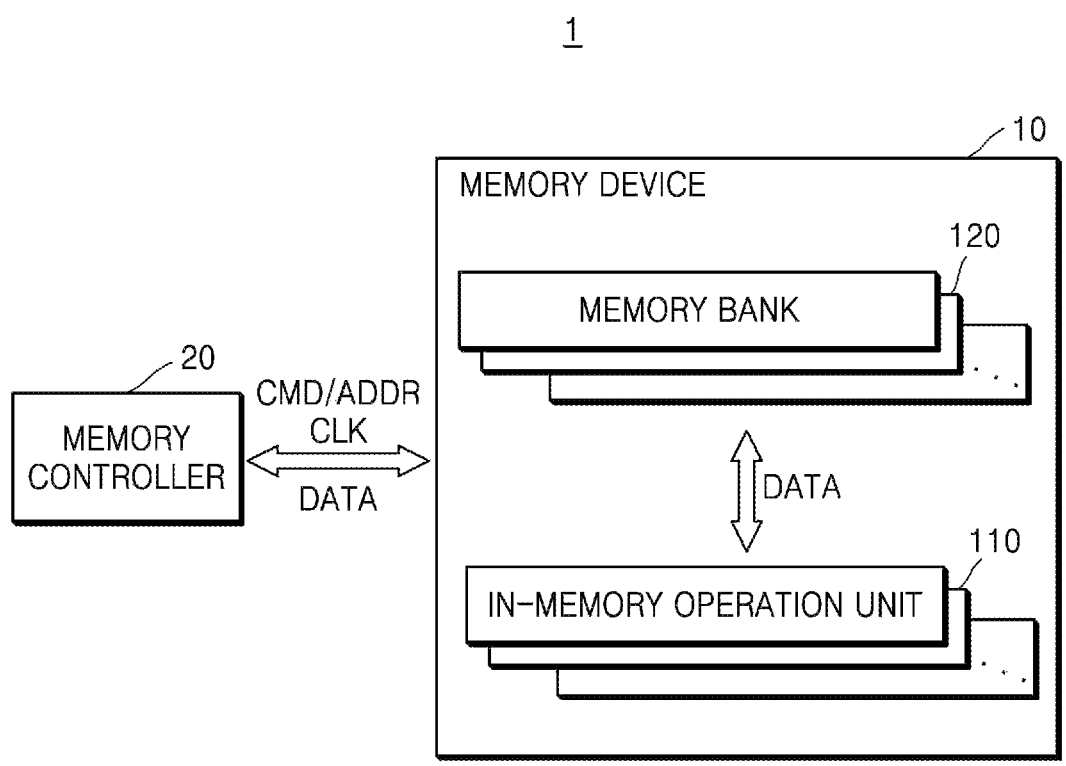
FIG. 1 is a block diagram of a memory system according to an example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to accompanying drawings. However, the examples may be implemented in many different forms and are not limited to those described herein.

FIG. 1 is a block diagram of a memory system 1 according to an example.

Referring to FIG. 1, the memory system 1 may include a memory device 10 and a memory controller 20. The memory device 10 may include a plurality of in-memory operation units 110 performing in-memory processing and a plurality of memory banks 120 including a plurality of memory cells.

The memory device 10 may be implemented as a memory chip or a memory module. The memory controller 20 may be implemented as a part of a host or the memory device 10 and the memory controller 20 may be arranged in one memory module. In other words, an implementation form may vary and is not limited to one. Although the host is not shown in FIG. 1, the host is a functional block performing a computing operation by controlling the memory system 1 and may correspond to a central processing unit (CPU), a digital signal processor (DSP), a graphics processing unit (GPU), or an application processor (AP).

The memory controller 20 may provide various signals to the memory device 10 to control all operations of the memory device 10. For example, the memory controller 20 may control a memory access operation of the memory device 10, such as read and write. In particular, the memory controller 20 may provide a command CMD and an address ADDR to the memory device 10 to write data DATA on the memory device 10 or read the data DATA from the memory device 10. Also, the memory controller 20 may further provide a clock signal CLK to the memory device 10.

The command CMD may include an active command for switching the memory banks 120 to an active state to read or write data. In response to the active command, the memory device 10 may activate rows, i.e., word lines, included in the memory banks 120. Also, the command CMD may include a precharge command for switching the memory banks 120 from the active state to a standby state after the reading or writing of the data is completed. Also, the command CMD may include a refresh command for controlling a refresh operation of the memory banks 120. However, the types of commands CMD described herein are only examples and there may be other types of commands CMD.

The memory controller 20 may provide various signals to the memory device 10 to control in-memory processing operations of the in-memory operation units 110. For example, the memory controller 20 may provide, to the memory device 10, a signal instructing the in-memory processing operations of the in-memory operation units 110 via a combination of the command CMD, the address ADDR, and/or the clock signal CLK.

The in-memory operation units 110 may be implemented as processing elements (PEs) for performing operation processing in the memory device 10. In other words, the in-memory operation units 110 may perform in-memory processing (or internal processing) in the memory device 10.

In particular, the in-memory operation units 110 may perform a data operation on the data DATA stored in the memory banks 120 and/or the data DATA received from the memory controller 20, and may store the data DATA of an operation result in the memory banks 120 or provide the data DATA of the operation result to the memory controller 20. Accordingly, the in-memory operation unit 110 may also be referred to as processor in memory (PIM) or a function in memory (FIM).

The in-memory operation unit 110 may be an arithmetic logic unit (ALU) or multiply-accumulate (MAC). For example, the in-memory operation units 110 may perform logical operations such as data invert, data shift, data swap, data compare, AND, and XOR, mathematical operations such as addition and subtraction, and data operations.

The number of in-memory operation units 110 and the number of memory banks 120 included in the memory device 10 may vary. Also, n memory banks 120 may be assigned to one in-memory operation unit 110, wherein n is a natural number.

For example, when the memory device 10 corresponds to a double data rate 4 dynamic random access memory (DDR4 DRAM) module, the number of memory banks 120 may be 16 and the number of in-memory operation units 110 may be 8, and the in-memory operation units 110 and the memory banks 120 may be mapped in 1:2 (n=2). Hereinafter, for convenience of description, it is assumed that two memory banks 120 are assigned to one in-memory operation unit 110 (n=2), but the configuration is not limited thereto.

Each of the memory banks 120 may include the plurality of memory cells. In particular, memory cells in the memory bank 120 may be at points where a plurality of word lines and a plurality of bit lines intersect each other. The memory banks 120 may store in-memory processing data. The in-memory processing data may include data on which an operation is to be performed by the in-memory operation units 110 and/or data generated as a result of performing an operation by the in-memory operation units 110.

The memory device 10 may include various types of memory, and for example, may include DRAM such as double data rate synchronous DRAM (DDR SDRAM), low power double data rate (LPDDR) SDRAM, graphics double data rate (GDDR) SDRAM, or rambus DRAM (RDRAM). However, the configurations are not limited thereto, and the memory device 10 may include a non-volatile memory such as a flash memory, magnetic RAM (MRAM), ferroelectric RAM (FeRAM), phase change RAM (PRAM), or resistive RAM (ReRAM).

Figure 2A:
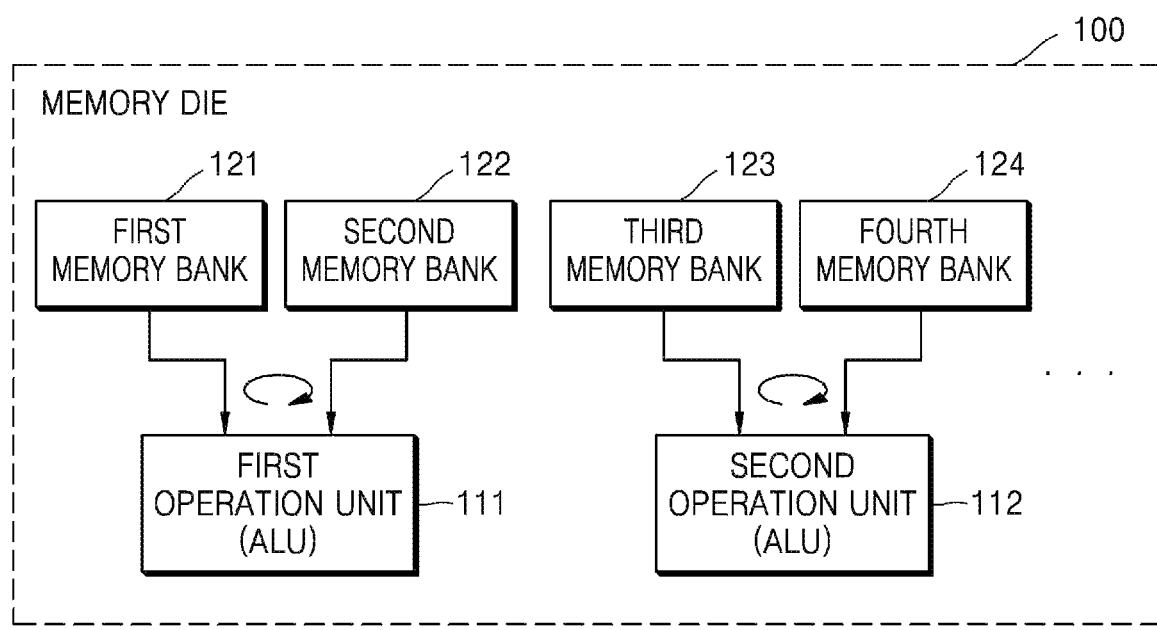
FIGS. 2A and 2B are diagrams for describing assignment ratios between memory banks and in-memory operation units, according to an example.
Figure 2B:
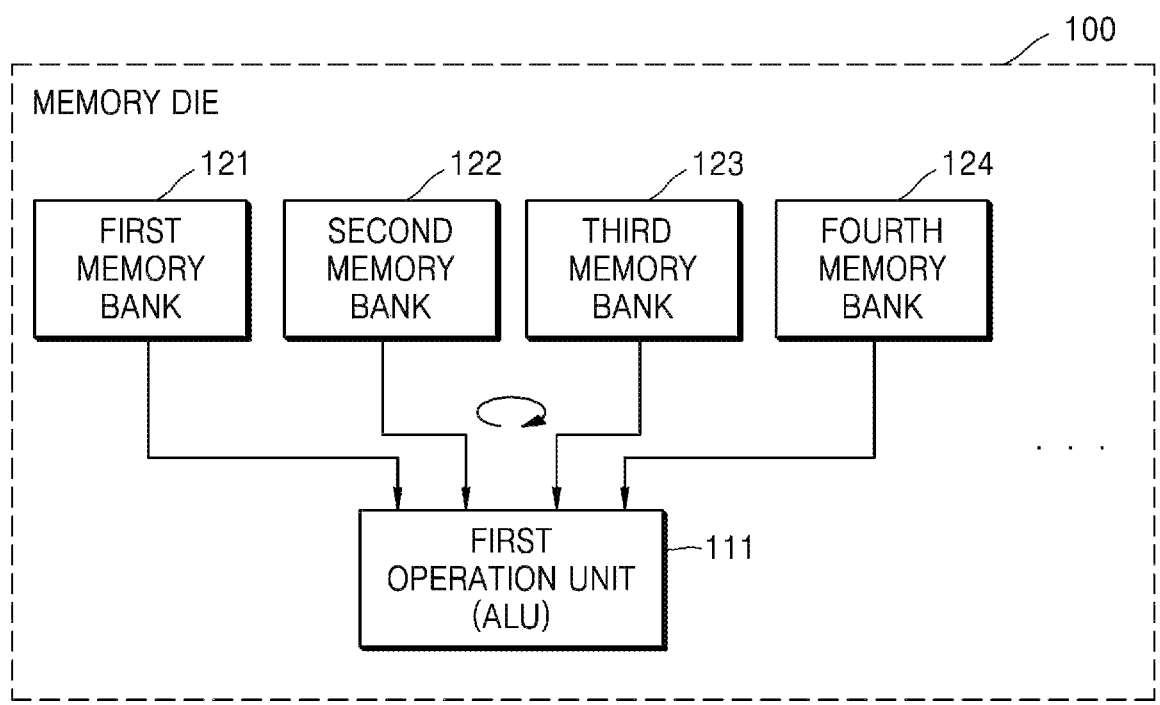

FIGS. 2A and 2B are diagrams for describing assignment ratios between memory banks and in-memory operation units, according to an example.

The memory device 10 of FIG. 1 may include a memory die 100 where the in-memory operation units 110 of FIG. 1 and the memory banks 120 of FIG. 1 are arranged, and FIGS. 2A and 2B illustrate some of the certain number of in-memory operation units 110 and some of the certain number of memory banks 120 provided on the memory die 100.

As shown in FIG. 2A, two memory banks (a first memory bank 121 and a second memory bank 122) may be assigned to one in-memory operation unit (a first operation unit 111) and two memory banks (a third memory bank 123 and a fourth memory bank 124) may be assigned to one in-memory operation unit (a second operation unit 112).

As shown in FIG. 2B, four memory banks (the first through fourth memory banks 121 through 124) may be assigned to one in-memory operation unit (the first operation unit 111).

In other words, the memory banks 120 provided in the memory device 10 may share one in-memory operation unit in units of n memory banks, and each in-memory operation unit may perform a data operation by accessing the corresponding n memory banks. Here, when the memory device 10 corresponds to a DDR4 DRAM module, n may be one of 2, 4, and 8, but is not limited thereto. As described above, in the examples, n=2 for convenience of description.

Figure 3:
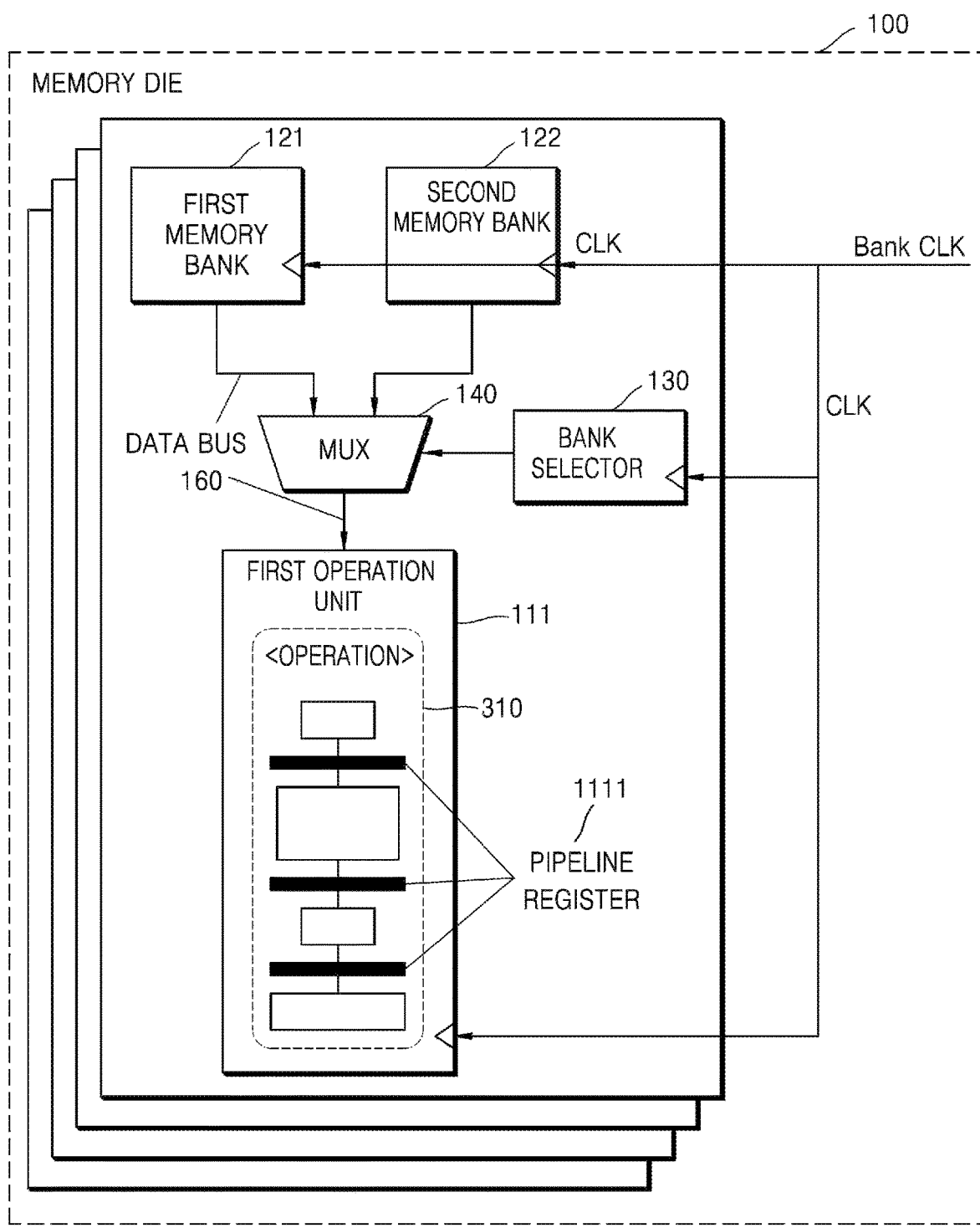
FIG. 3 is a diagram for describing a hardware connection between an in-memory operation unit and memory banks on a memory die, according to an example.

FIG. 3 is a diagram for describing a hardware connection between an in-memory operation unit and memory banks on the memory die 100, according to an example.

Referring to FIG. 3, an example in which two memory banks (the first memory bank 121 and the second memory bank 122) are assigned to one in-memory operation unit (the first operation unit 111) on the memory die 100 is illustrated. The example may be one of examples of the all in-memory operation units 110 and memory banks 120 provided on the memory die 100 and the remaining in-memory operation units 110 and memory banks 120 on the memory die 100 may be implemented and operate similar to the example of FIG. 3.

On the memory die 100, each in-memory operation unit (the first operation unit 111) and the memory banks (the first memory bank 121 and the second memory bank 122) are connected to each other. Here, the memory die 100 may include a bank selector 130 for selecting one of the two memory banks (the first memory bank 121 and the second memory bank 122) assigned to the first operation unit 111, and a multiplexer (MUX) 140 for providing, to the first operation unit 111, data accessed from a memory bank selected by the bank selector 130. Hardware components implemented on the memory die 100 may be connected to each other via a data bus 160.

The first operation unit 111 operates at an operation frequency (the clock signal CLK) to perform in-memory processing of a pipelined operation 310. Here, the pipelined operation 310 may be pipelined in multi-pipeline stages of sub-operation units processible within a first operation cycle corresponding to a first operation frequency of the first operation unit 111. The first operation unit 111 may include at least one pipeline register 1111 for buffering a sub-operation result in each pipeline stage of the pipelined operation 310.

Each of the first memory bank 121 and the second memory bank 122 operates at the operation frequency (the clock signal CLK) to perform an access operation of data requested from the first operation unit 111 while the pipelined operation 310 is performed.

The operation frequency (the clock signal CLK) is based on a bank clock signal provided from an external source (the memory controller 20 of FIG. 1 or the host), and the first operation unit 111, the memory banks (the first memory bank 121 and the second memory bank 122), and the bank selector 130 in the memory die 100 operate according to the operation frequency (the clock signal CLK).

Figure 4:
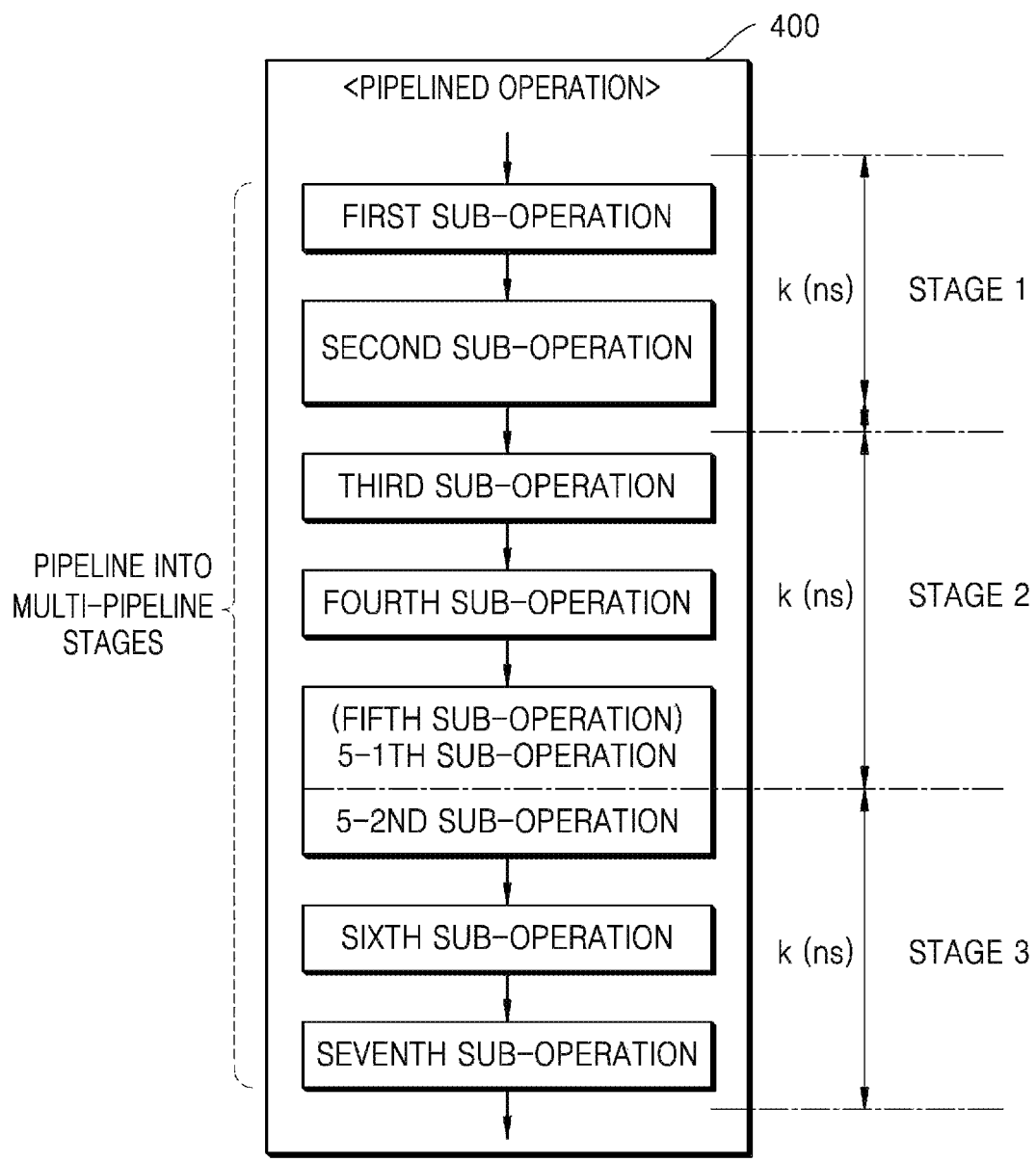
FIG. 4 is a diagram for describing pipelining of an operation, according to an example.

FIG. 4 is a diagram for describing pipelining of an operation, according to an example.

Pipelining is a technique for improving an operation processing speed by dividing a process of performing an operation into several stages and processing the stages in parallel (simultaneously).

Referring to FIG. 4, a given operation may be pipelined into multi-pipeline stages (first through third pipeline stages STAGE 1 through STAGE 3) including several sub-operations (for example, first through seventh sub-operations), and thus a pipelined operation 400 may be generated. Here, the given operation may be, for example, an MAC operation of a neural network, and each of the sub-operations (the first through seventh sub-operations) may be pipelined from a series of individual operations, such as data fetch, multiplication, addition, and data output.

The pipelined operation 400 includes multi-pipeline stages of seven sub-operations (first through seventh sub-operations). In particular, the first pipeline stage STAGE 1 includes the first and second sub-operations, the second pipeline stage STAGE 2 includes the third, fourth, and 5-1st sub-operations, and the third pipeline stage STAGE 3 includes the 5-2nd, sixth, and seventh sub-operations. Here, the 5-1st and 5-2nd sub-operations are divided from the fifth sub-operation. As such, one sub-operation is divided into several sub-operations again to classify operations processible within one cycle of an in-memory operation unit (for example, an operation cycle k(ns)).

When the given operation is pipelined in units of operation cycles k(ns) corresponding to the operation frequency (clock signal CLK) of the in-memory operation unit (the first operation unit 111 of FIG. 3), the in-memory operation unit (the first operation unit 111 of FIG. 3) may process the pipelined operation 400 (three pipeline stages, i.e., the first through third pipeline stages STAGE 1 through STAGE 3) throughout 3 cycles total and perform pipelining for each cycle (operation cycle: k(ns)). Because the operation frequency (clock signal CLK) of each memory bank (the first or second memory bank 121 or 122) is the same as the operation frequency (clock signal CLK) of the in-memory operation unit (the first operation unit 111), the in-memory operation unit (first the operation unit 111) may access one memory bank (the first or second memory bank 121 or 122) within the operation cycle (k(ns)) of the memory bank (the first or second memory bank 121 or 122).

Figure 5:
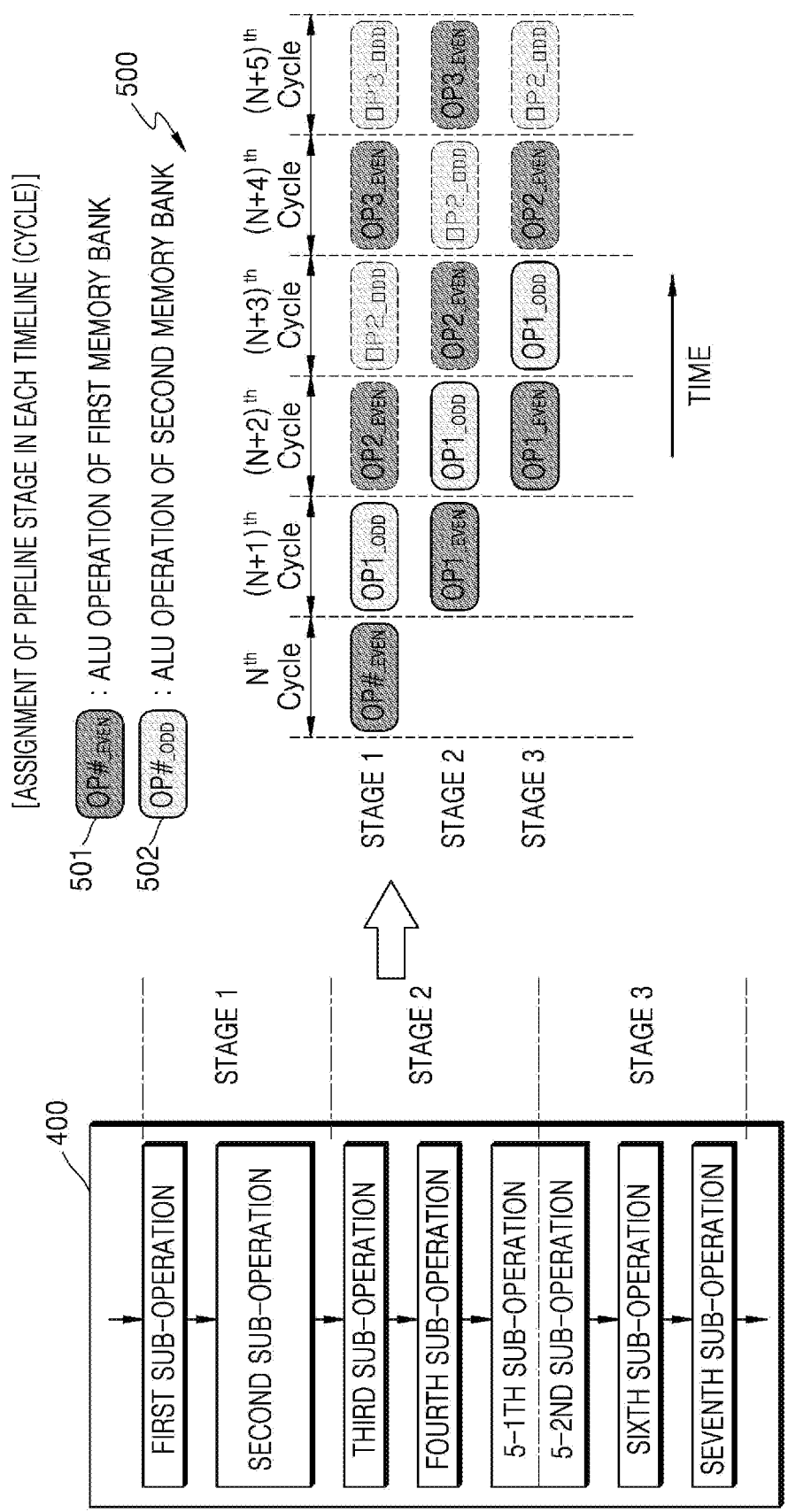
FIG. 5 is a diagram for describing pipeline stages being assigned to each memory bank for in-memory processing of the pipelined operation of FIG. 4, according to an example.

FIG. 5 is a diagram for describing pipeline stages being assigned to each memory bank for in-memory processing of the pipelined operation 400 of FIG. 4, according to an example.

Referring to FIG. 5, a case 501 in which the in-memory operation unit (the first operation unit 111 of FIG. 3) processes operation data OP #$_{\_EVEN}$ accessed from the first memory bank 121 of FIG. 3 and a case 502 in which the in-memory operation unit (the first operation unit 111) processes operation data OP #$_{\_ODD}$ accessed from the second memory bank 122 of FIG. 3 are illustrated. In the cases 501 and 502, the first and second memory banks 121 and 122 operate to process the pipelined operation 400 (first through third pipeline stages STAGE 1 through STAGE 3) requested by the in-memory operation unit (the first operation unit 111), respectively.

Pipeline stage assignment 500 in each timeline (cycle) will be described. Here, each cycle in the pipeline stage assignment 500 denotes the operation cycle (k(ns)) corresponding to the operation frequency (clock signal CLK) described above.

In an Nth cycle, the first operation unit 111 accesses the first memory bank 121 to read data of operation 1$_{\_EVEN}$ OP1$_{\_EVEN}$ and processes the first pipeline stage STAGE 1 of the operation 1$_{\_EVEN}$ OP1$_{\_EVEN}$.

In an (N+1)th cycle, the first operation unit 111 accesses the second memory bank 122 to read data of operation 1$_{\_ODD}$ OP1$_{\_ODD}$ and processes the first pipeline stage STAGE 1 of the operation 1_ODD OP1$_{\_ODD}$. In the (N+1)th cycle, the first operation unit 111 may process the second pipeline stage STAGE 2 of the operation 1$_{\_EVEN}$ OP1$_{\_EVEN}$, based on pipelining.

In an (N+2)th cycle, the first operation unit 111 accesses the first memory bank 121 to read data of another operation 2$_{\_EVEN}$ OP2$_{\_EVEN}$ different from the operation 1$_{\_EVEN}$ OP1$_{\_EVEN}$. The first operation unit 111 processes the first pipeline stage STAGE 1 of the operation 2$_{\_EVEN}$ OP1$_{\_EVEN}$. In the (N+2)th cycle, the first operation unit 111 may process the third pipeline stage STAGE 3 of the operation 1$_{\_EVEN}$ OP1$_{\_EVEN}$ and the second pipeline stage STAGE 2 of the operation 1$_{\_ODD}$ OP1$_{\_ODD}$, based on pipelining.

In other words, the first operation unit 111 may access the first and second memory banks 121 and 122 alternately in each cycle to read data of each operation, and may process the first through third pipeline stages STAGE 1 through STAGE 3 in parallel by using data of the pipelined operation 400 read from each of the first and second memory banks 121 and 122 in each cycle.

Figure 6:
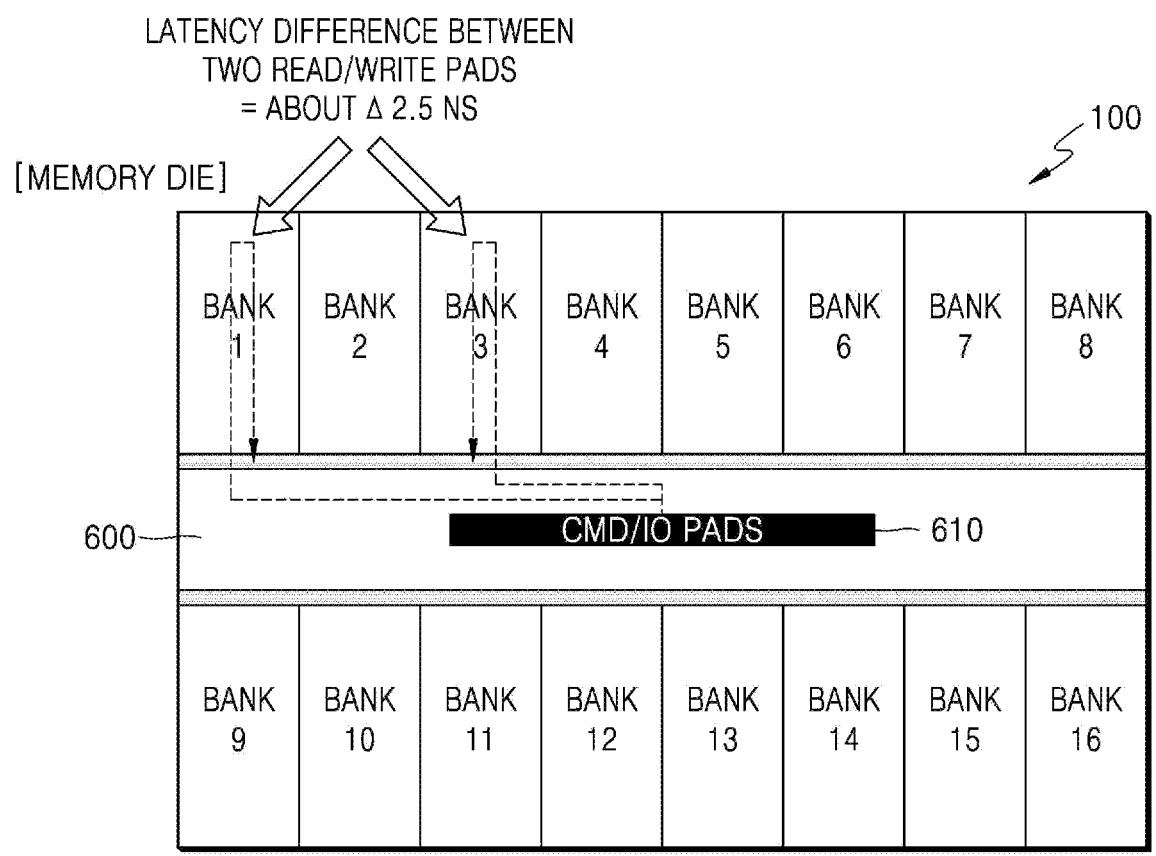
FIG. 6 is a diagram for describing a latency difference that may occur when memory banks arranged at different locations are accessed (read/written)

FIG. 6 is a diagram for describing a latency difference that may occur when memory banks arranged at different locations are accessed (read/written).

Referring to FIG. 6, a first set of memory banks BANK 1 through BANK 8 arranged on one side and a second set of memory banks BANK 9 through BANK 16 arranged on another side may be arranged on the memory die 100. Also, an input/output (IO) interface including command/IO (CMD/IO) pads 610 may be provided in a region 600 between the first set of memory banks BANK 1 through BANK 8 and the second set of memory banks BANK 9 through BANK 16 on the memory die 100. The CMD/IO pads 610 may also be referred to as command pads. The IO interface may additionally include a global decoder for decoding signals transmitted from an external source to the CMD/IO pads 610 and transmitting the decoded signals to memory banks.

For example, a case in which a command signal is transmitted from the external source to the CMD/IO pads 610 and data for two memory banks BANK 1 and BANK 3 is accessed according to the command signal decoded by the global decoder will be described.

Referring to FIG. 6, a data transmission distance from the CMD/IO pads 610 to the memory bank BANK 3 on the memory die 100 is nearer than a data transmission distance from the CMD/IO pads 610 to the memory bank BANK 1. Accordingly, due to a difference in a physical distance between the memory banks BANK1 and BANK 3 for data access, a latency difference (for example, about Δ2.5 ns) may occur in command/data signals for accessing each of the memory banks BANK 1 and BANK 3.

In other words, the latency difference described in FIG. 6 may occur due to the difference in physical distance for data transmission according to locations of the memory banks BANK 1 through BANK 16 on the memory die 100.

Figure 7:
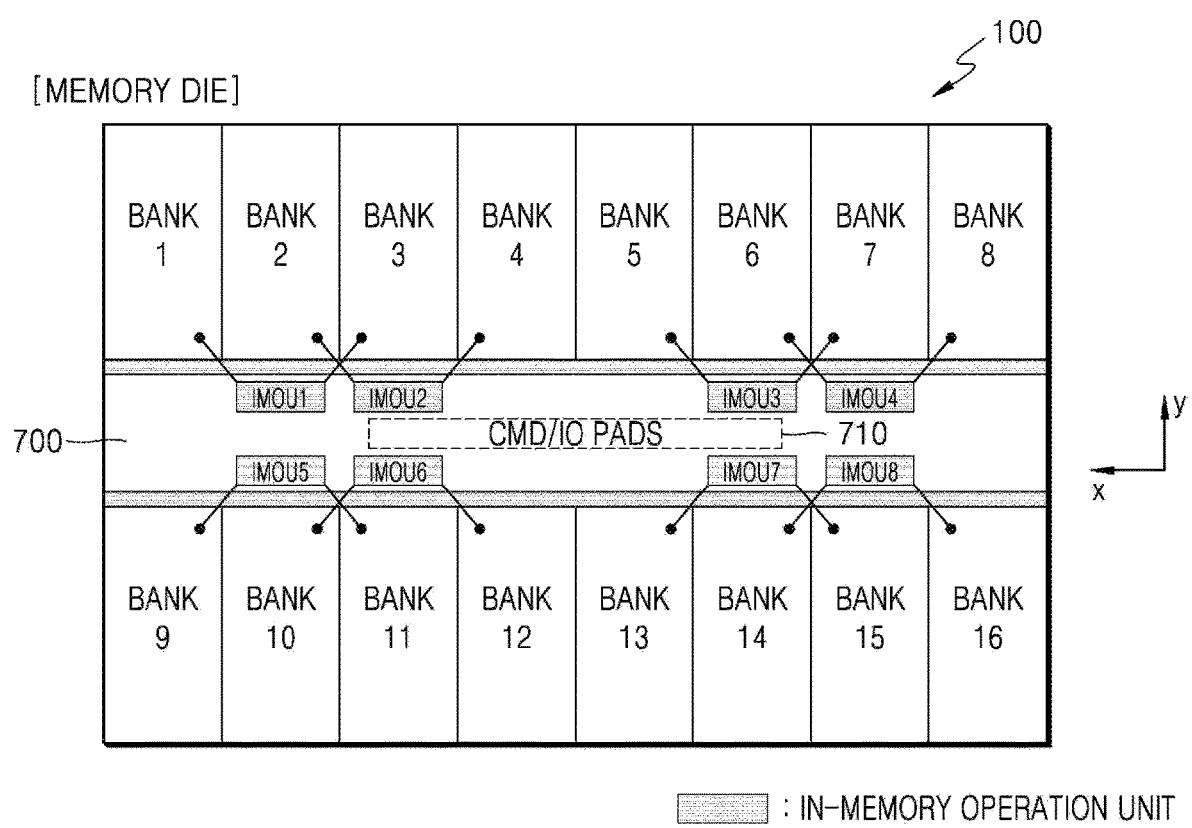
FIG. 7 is a diagram for describing an arrangement in-memory operation units on a memory die, according to an example.

FIG. 7 is a diagram for describing an arrangement of in-memory operation units on the memory die 100, according to an example.

Referring to FIG. 7, as described with reference to FIG. 6, the first set of memory banks BANK 1 through BANK 8 are arranged at one side and the second set of memory banks BANK 9 through BANK 16 are arranged at the other side may be arranged on the memory die 100. Also, an IO interface including CMD/IO pads 710 may be arranged in a region 700 between the first set of memory banks BANK 1 through BANK 8 and the second set of memory banks BANK 9 through BANK 16 on the memory die 100.

A first set of in-memory operation units IMOU1 through IMOU4 arranged adjacent to and connected to the first set of memory banks BANK 1 through BANK 8, and a second set of in-memory operation units IMOU5 through IMOU8 arranged adjacent to and connected to the second set of memory banks BANK 9 through BANK 16 may be arranged in the region 700.

The memory banks BANK 1 through BANK 16 may be assigned to the in-memory operation units IMOU1 through IMOU8 in units of n memory banks, respectively, wherein n=2.

In particular, an example of a mapping relationship between the first set of memory banks BANK 1 through BANK 8 and the first set of in-memory operation units IMOU1 through IMOU4 will be described.

The first set of memory banks BANK 1 through BANK 8 may be classified into, based on locations of the CMD/IO pads 710, the memory banks BANK 3 through BANK 6 relatively near the CMD/IO pads 710 and the memory banks BANK 1, BANK2, BANK 7, and BANK 8 relatively far from the CMD/IO pads 710. Each of the first set of in-memory operation units IMOU1 through IMOU4 may be mapped (assigned) and connected to one of the memory banks BANK 3 through BANK 6 relatively near the CMD/IO pads 710 and one of the memory banks BANK 1, BANK2, BANK 7, and BANK 8 relatively far from the CMD/IO pads 710.

For example, the first in-memory operation unit IMOU1 may be mapped to the far memory bank BANK 1 and the near memory bank BANK 3, and the second in-memory operation unit IMOU2 may be mapped to the far memory bank BANK 2 and the near memory bank BANK 4. Similarly, the third in-memory operation unit IMOU3 may be mapped to the far memory bank BANK 7 and the near memory bank BANK 5, and the fourth in-memory operation unit IMOU4 may be mapped to the far memory bank BANK 8 and the near memory bank BANK 6. In other words, each of the first set of in-memory operation units IMOU1 through IMOU4 may be arranged between a far memory bank and a near memory bank at equal distances therebetween.

The second set of memory banks BANK 9 through BANK 16 and the second set of in-memory operation units IMOU5 through IMOU8 may be mapped in a similar manner as described above.

According to such arrangement and mapping methods of the in-memory operation units IMOU1 through IMOU8, because data transmission distances (i.e., a physical distances) of two memory banks mapped to one in-memory operation unit from the CMD/IO pads 710 are different from each other, a latency difference described above with reference to FIG. 6 may occur.

Figure 8:
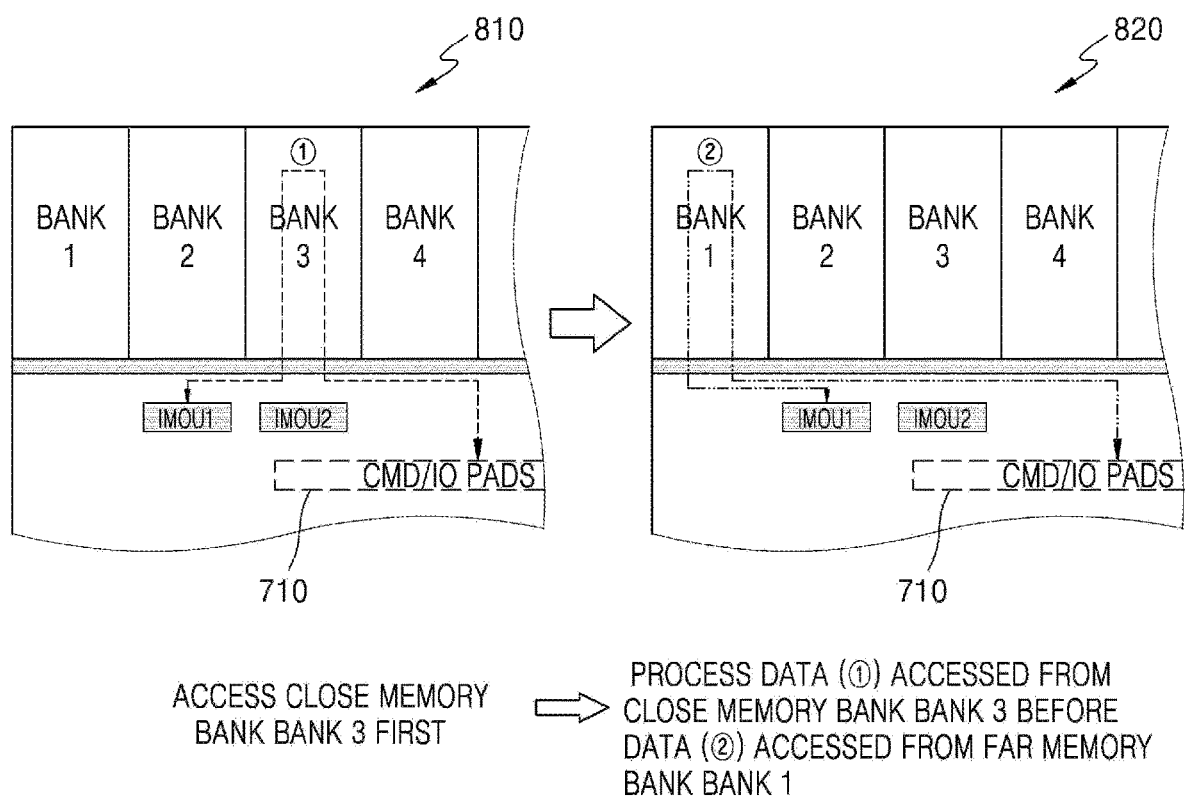
FIG. 8 is a diagram for describing a method by which memory banks mapped to in-memory operation units process operations, according to an example.

FIG. 8 is a diagram for describing a method by which memory banks mapped to in-memory operation units process operations, according to an example.

Referring to FIG. 8, an example in which the first in-memory operation unit IMOU1 and the memory banks BANK 1 and BANK 3 mapped to the first in-memory operation unit IMOU1 process an operation will be described.

The far memory bank BANK 1 and the near memory bank BANK 3 are mapped to the first in-memory operation unit IMOU1. Here, because the data transmission distances (i.e., physical distances) of the far memory bank BANK 1 and the near memory bank BANK 3 from the CMD/IO pads 710 are different from each other, there may be a latency difference regarding data access.

The first in-memory operation unit IMOU1 may perform in-memory processing faster in a case 810 in which data access is performed on the near memory bank BANK 3 according to a command signal transmitted from an external source to the CMD/IO pads 710 than in a case 820 in which data access is performed on the far memory bank BANK 1.

Accordingly, the first in-memory operation unit IMOU1 processes a pipelined operation by first accessing the memory bank BANK 3 relatively near the CMD/IO pads 710 from among the mapped memory banks BANK1 and BANK 3. Then, the first in-memory operation unit IMOU1 processes the pipelined operation by accessing the relatively far memory bank BANK 1.

According to such a method, the first operation unit 111 processing the operation data OP #$_{\_EVEN}$ accessed from the first memory bank 121 described with reference to FIG. 5 may correspond to the first in-memory operation unit IMOU1 processing data ① accessed from the near memory bank BANK 3. Similarly, the first operation unit 111 processing the operation data OP #$_{\_ODD}$ accessed from the second memory bank 122 described with reference to FIG. 5 may correspond to the first in-memory operation unit IMOU1 processing data ② accessed from the far memory bank BANK 1.

In-memory processing regarding a pipelined operation may also be performed between remaining memory banks and in-memory operation units of FIG. 7 in a similar manner as described with reference to FIG. 8.

Figure 9:
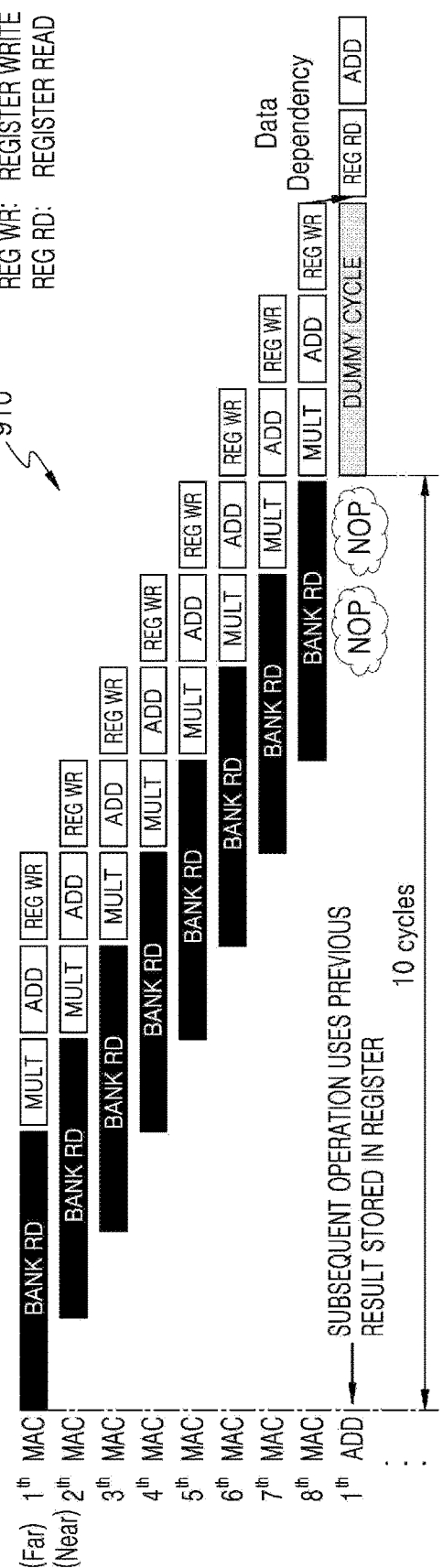
FIG. 9 is a diagram for comparing a case in which a far memory bank is first accessed and a case in which a near memory bank is accessed first, according to an example.
Figure 9:
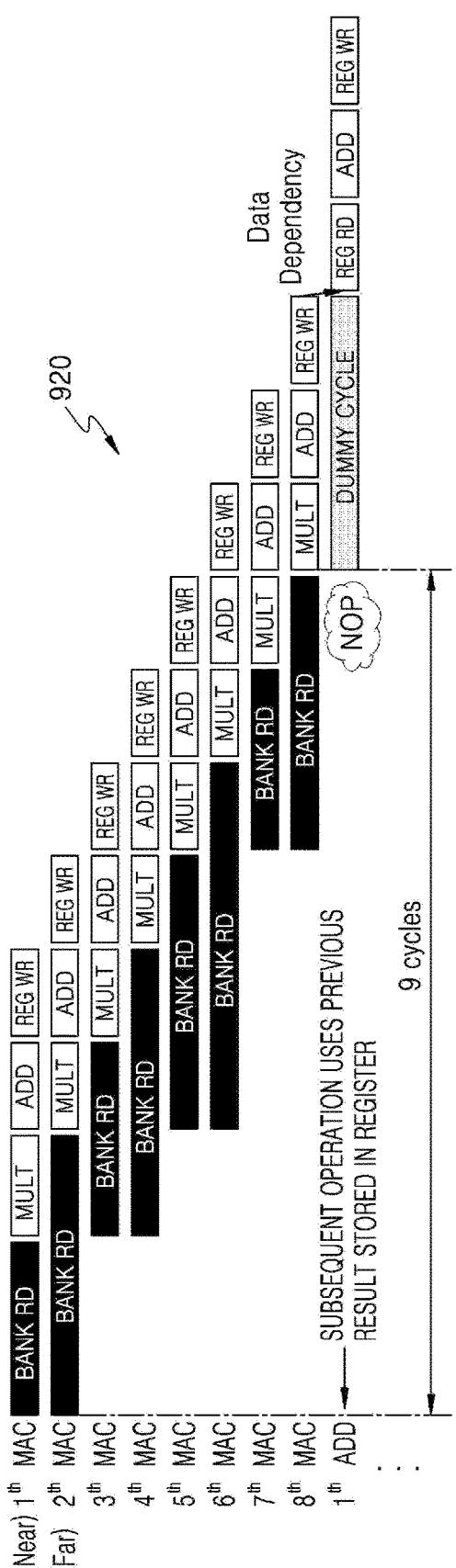

FIG. 9 is a diagram for comparing a case 910 in which a far memory bank is first accessed and a case 920 in which a near memory bank is accessed first, according to an example.

Referring to FIG. 9, in the case 910 in which an in-memory operation unit (for example, the first in-memory operation unit IMOU 1 of FIG. 8) accesses the far memory bank (for example, the memory bank BANK 1 of FIG. 8) first, 10 cycles total may be required until first MAC operation to eighth MAC operation are performed. However, in the case 920 in which the first in-memory operation unit IMOU1 accesses the near memory bank (for example, the memory bank BANK 3 of FIG. 8) first, 9 cycles total may be required until the first through eighth MAC operations are performed. In other words, in-memory processing may be performed at a fast/faster speed when an in-memory operation unit first accesses a memory bank relatively near CMD/IO pads from among memory banks mapped to the in-memory operation unit. In other words, in the case 920 in which the near memory bank is accessed first, no operation cycle (NOP) may be reduced until a subsequent operation (i.e., a first ADD operation) having data dependency is performed, and thus, the in-memory processing may be completed at a fast/faster speed. According to a simulation result of FIG. 9, about 10% of operation time (about 1 cycle=about 2.5 ns) may be reduced when an in-memory operation unit accesses a near memory bank first.

Figure 10:
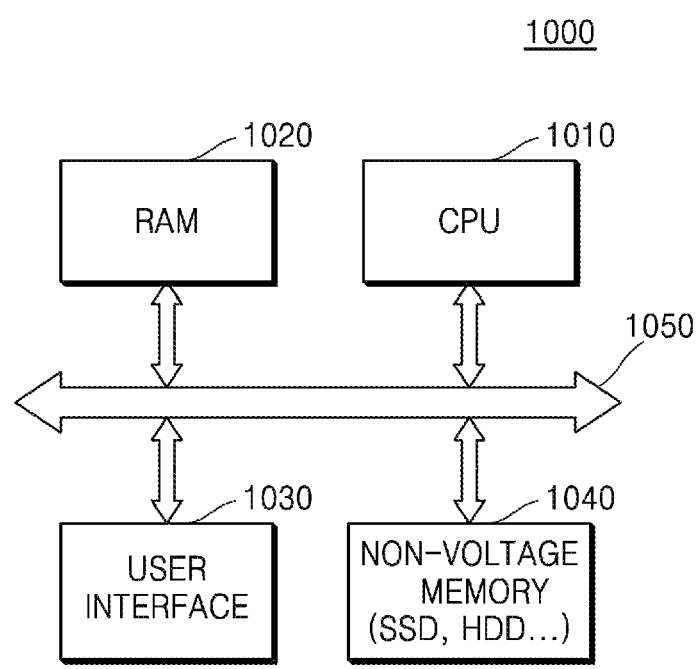
FIG. 10 is a block diagram of a computing system including a memory device, according to an example.

FIG. 10 is a block diagram of a computing system 1000 including a memory device, according to an example. A memory device performing in-memory processing described above may be mounted on, as random-access memory (RAM) 1020, the computing system 1000, such as a mobile device or a desktop computer. One of the embodiments described above may be applied to the memory device mounted as the RAM 1020.

In particular, the memory device performing in-memory processing and mountable as the RAM 1020 includes a plurality of in-memory operation units performing in-memory processing of a pipelined operation, and a plurality of memory banks assigned to each in-memory operation unit in units of n memory banks and performing an operation of accessing data requested by each in-memory operation unit while the pipelined operation is processed.

The memory device includes a memory die where the in-memory operation units and memory banks are arranged, the plurality of memory banks may include a first set of memory banks arranged at one side and a second set of memory banks arranged at another side on the memory die, and the plurality of in-memory operation units may include a first set of in-memory operation units arranged adjacent to the first set of memory banks in a region between the first set of memory banks and the second set of memory banks and connected to the first set of memory banks, and a second set of in-memory operation units arranged adjacent to the second set of memory banks in the region and connected to the second set of memory banks. Each in-memory operation unit may perform the pipelined operation on accessed data from a memory bank arranged relatively near before a memory bank arranged relatively far on the memory die.

The memory die may include a bank selector sequentially selecting one of n memory banks assigned to a first in-memory operation unit, based on a data transmission distance, and a multiplexer providing data accessed by the memory bank selected by the bank selector to the first in-memory operation unit.

When the memory device mounted on the RAM 1020 is a DDR4 DRAM module, the plurality of memory banks include the first set of 8 memory banks and the second set of 8 memory banks, and the plurality of in-memory operation units may include the first set of 8/n in-memory operation units and the second set of 8/n in-memory operation units, wherein n is one of 2, 4, and 8. Here, the first set of memory banks may include first through eighth memory banks in an order of a first direction (x-axis) and the first set of in-memory operation units may include first through fourth in-memory operation units in an order of the first direction (x-axis). When n=2, the first and third memory banks may be assigned to the first in-memory operation unit, the second and fourth memory banks may be assigned to the second in-memory operation unit, the fifth and seventh memory banks may be assigned to the third in-memory operation unit, and the sixth and eighth memory banks may be assigned to the fourth in-memory operation unit. A connection between the second set of memory banks and the second set of in-memory operation units may be symmetrical to a connection between the first set of memory banks and the first set of in-memory operation units.

The computing system 1000 includes a central processing unit (CPU) 1010, the RAM 1020, a user interface 1030, and a non-volatile memory 1040, which are electrically connected to each other via a bus 1050. The non-volatile memory 1040 may be a mass storage device such as a solid state drive (SSD) or a hard disk drive (HDD).

When the memory device (or memory system) described above is applied to the computing system 1000, the memory device included in the RAM 1020 may perform in-memory processing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A memory, the memory comprising:
   a plurality of memory operation circuitries configured to perform memory processing;
   a plurality of memory banks assigned to the plurality of memory operation circuitries such that a set of n memory banks, of the plurality of memory banks, is assigned to each of the plurality of memory operation circuitries; and
   a memory die containing the plurality of memory operation circuitries, the plurality of memory banks, and command pads,
   wherein, for each of the sets of n memory banks, a corresponding memory operation circuitry is configured to access first data from a first memory bank before accessing second data from a second memory bank to perform the memory processing,
   wherein each of the sets of n memory banks includes the first memory bank having a first data transmission distance to the command pads and the second memory bank having a second data transmission distance to the command pads that is larger than the first data transmission distance, and
   wherein n is a natural number.

2. The memory of claim 1, wherein the first data transmission distance is a first physical distance for data transmission of a command signal provided from the command pads and the second data transmission distance is a second physical distance for data transmission of a command signal provided from the command pads.

3. The memory of claim 1, wherein the memory die further comprises:
   a bank selector configured to sequentially select, for each of the sets of n memory banks, the first memory bank and the second memory bank based on the first data transmission distance and the second data transmission distance; and
   for each of the sets of n memory banks, a multiplexer configured to provide, to the corresponding memory operation circuitry, data accessed from the first memory bank or the second memory bank selected by the bank selector for the corresponding set of n memory banks.

4. The memory of claim 1, wherein
   the plurality of memory banks comprises:
      a first set of memory banks arranged at a first side on the memory die; and
      a second set of memory banks arranged at a second side on the memory die, and
   the plurality of memory operation circuitries comprises:
      a first set of memory operation circuitries, arranged adjacent to the first set of memory banks, and connected to the first set of memory banks, in a region between the first set of memory banks and the second set of memory banks; and
      a second set of memory operation circuitries, arranged adjacent to the second set of memory banks, and connected to the second set of memory banks in the region.

5. The memory of claim 4, wherein
   the command pads are arranged between the first set of memory operation circuitries and the second set of memory operation circuitries in the region, and
   for each respective set of n memory banks of the first and second sets of memory banks, the first memory bank and the second memory bank are classified according to the first data transmission distance and the second data transmission distance within the region.

6. The memory of claim 4, wherein
   the first set of memory banks are classified into a first group of memory banks that is arranged closer to the command pads and a second group of memory banks that is arranged farther away from the command pads, and
   for each set of n memory banks of the first group of memory banks, the first memory bank is selected from the first group and the second memory bank is selected from the second group.

7. The memory of claim 4, wherein
   a first set of n memory banks, of the first set of memory banks, are assigned to a first memory operation circuitry from among the first set of memory operation circuitries, and
   the first memory operation circuitry processes an operation pipelined in multi-pipeline stages with respect to first data accessed from the first memory bank of the first set of n memory banks before second data is accessed from the second memory bank of the first set of n memory banks.

8. The memory of claim 4, wherein
the memory is a double data rate 4 dynamic random-access memory (DDR4 DRAM) module,
the first set of memory banks comprises 8 memory banks and the second set of memory banks comprises 8 memory banks, and
the first set of memory operation circuitries comprises first 8/n memory operation circuitries and the second set of memory operation circuitries comprises second 8/n memory operation circuitries.

9. The memory of claim 4, wherein
the first set of memory banks comprises first, second, third, fourth, fifth, sixth, seventh, and eighth memory banks in an order of a first direction,
the first set of memory operation circuitries comprise first, second, third, and fourth memory operation circuitries in the order of the first direction, and
the first and third memory banks are assigned to the first memory operation circuitry, the second and fourth memory banks are assigned to the second memory operation circuitry, the fifth and seventh memory banks are assigned to the third memory operation circuitry, and the sixth and eighth memory banks are assigned to the fourth memory operation circuitry.

10. The memory of claim 4, wherein connections between the second set of memory banks and the second set of memory operation circuitries are symmetrical to connections between the first set of memory banks and the first set of memory operation circuitries.

11. The memory of claim 1, wherein the memory processing comprises an operation pipelined in multi-pipeline stages.

12. The memory of claim 11, wherein each of the memory operation circuitries comprises at least one pipeline register configured to buffer a sub-operation result in each pipeline stage of the pipelined operation.

13. The memory of claim 11, wherein the pipelined operation comprises a multiply-accumulate (MAC) operation of a neural network.

14. The memory of claim 1, wherein each of the plurality of memory circuitries have a processor-in-memory (PIM) hardware structure.

15. The memory of claim 1, wherein, for each of the sets of n memory banks, a first memory operation circuitry, of the plurality of memory operation circuitries, is connected to the first memory bank and the second memory bank at equal distances between.

16. A memory comprising:
memory operation circuitries configured to perform memory processing;
memory banks, each memory bank being assigned to one of the memory operation circuitries such that a set of n memory banks is assigned to each of the memory operation circuitries; and
command pads configured to receive a command signal from an external source,
wherein, for each of the memory operation circuitries, a corresponding memory operation circuitry is configured to access memory banks of a corresponding set of n memory banks that is assigned to the corresponding memory operation circuitry, in an order determined based on respective distances from each of the memory banks of the corresponding set of n memory banks to the command pads, and
wherein, each of the memory banks of the corresponding set of n memory banks is configured to perform an access operation of data requested by the corresponding memory operation circuitry while the memory processing is performed, and
wherein n is a natural number.

17. The memory of claim 16, wherein each of the respective distances are respective data transmission distances.

18. The memory of claim 17, wherein, for each of the memory operation circuitries, the corresponding memory operation circuitry is configured to respectively access the memory banks of the corresponding set of n memory banks in an ascending order of the respective data transmission distances.

19. The memory of claim 16, wherein each of the respective distances are respective physical distances.

20. The memory of claim 19, wherein, for each of the memory operation circuitries, the corresponding memory operation circuitry is configured to respectively access the memory banks of the corresponding set of n memory banks in an ascending order of the respective physical distance.

* * * * *